US012266075B2

(12) United States Patent
Zhang et al.

(10) Patent No.: US 12,266,075 B2
(45) Date of Patent: Apr. 1, 2025

(54) METHODS AND APPARATUS TO FACILITATE REGIONAL PROCESSING OF IMAGES FOR UNDER-DISPLAY DEVICE DISPLAYS

(71) Applicant: QUALCOMM Incorporated, San Diego, CA (US)

(72) Inventors: Nan Zhang, Beijing (CN); Yongjun Xu, Beijing (CN); Dileep Marchya, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 17/753,681

(22) PCT Filed: Oct. 14, 2020

(86) PCT No.: PCT/CN2020/120789
§ 371 (c)(1),
(2) Date: Mar. 10, 2022

(87) PCT Pub. No.: WO2021/073519
PCT Pub. Date: Apr. 22, 2021

(65) Prior Publication Data
US 2022/0343459 A1 Oct. 27, 2022

(30) Foreign Application Priority Data

Oct. 15, 2019 (WO) ................ PCT/CN2019/111219

(51) Int. Cl.
*G06T 3/40* (2024.01)
*G06T 1/20* (2006.01)
(52) U.S. Cl.
CPC . *G06T 3/40* (2013.01); *G06T 1/20* (2013.01)

(58) Field of Classification Search
CPC ........... G06T 3/40; G06T 1/20; G06T 15/503; G09G 5/377; G09G 2340/0407;
(Continued)

(56) References Cited

U.S. PATENT DOCUMENTS 10,504,278 B1 * 12/2019 Hornbeck ............... G06F 3/013
2006/0158545 A1 * 7/2006 Hirai ....................... H04N 5/74
348/333.01
(Continued)

FOREIGN PATENT DOCUMENTS

CN 101120589 A 2/2008
CN 107123078 A 9/2017
(Continued)

OTHER PUBLICATIONS

International Search Report and Written Opinion—PCT/CN2020/120789—ISA/EPO—Jan. 13, 2021.
(Continued)

*Primary Examiner* — Bobbak Safaipour
(74) *Attorney, Agent, or Firm* — Arent Fox, LLP

(57) ABSTRACT

The present disclosure relates to methods and apparatus for display processing. For example, disclosed techniques facilitate regional processing of images for under-display device displays. Aspects of the present disclosure can identify a subsection of a set of frame layers, the identified subsection corresponding to a lower pixel density region, relative to at least one other region, of a display. Aspects of the present disclosure can also blend first pixel data for each frame layer corresponding to the identified subsection to generate second pixel data. Further, aspects of the present disclosure can populate a buffer layer based on the second pixel data. Additionally, aspects of the present disclosure can blend pixel data from the set of frame layers and the buffer layers to generate a blended image. Aspects of the present (Continued)

disclosure can also transmit the blended image for presentment via the display.

20 Claims, 12 Drawing Sheets

(58) Field of Classification Search
CPC ......... G09G 2340/045; G09G 2340/10; G09G 2340/12; G09G 2350/00; G09G 2360/122; G09G 5/14; G09G 5/393
See application file for complete search history.

(56) References Cited

U.S. PATENT DOCUMENTS

| | | | |
|---|---|---|---|
| 2015/0062171 A1* | 3/2015 | Cho | G06T 11/40 345/634 |
| 2015/0213632 A1 | 7/2015 | Trask et al. | |
| 2017/0111631 A1 | 4/2017 | Lee et al. | |
| 2019/0043249 A1* | 2/2019 | Papava | G06F 9/5044 |
| 2019/0064575 A1 | 2/2019 | Yang et al. | |
| 2019/0174074 A1 | 6/2019 | Fukuoka | |
| 2020/0051213 A1* | 2/2020 | Nallam | G09G 3/20 |
| 2024/0062467 A1* | 2/2024 | Sarkis | G06V 10/82 |

FOREIGN PATENT DOCUMENTS

| | | |
|---|---|---|
| CN | 107209390 A | 9/2017 |
| CN | 107657598 A | 2/2018 |
| CN | 108388461 A | 8/2018 |
| CN | 109285126 A | 1/2019 |
| CN | 109388448 A | 2/2019 |
| JP | 2014171645 A | 9/2014 |
| JP | 2018187310 A | 11/2018 |

OTHER PUBLICATIONS

International Search Report and Written Opinion—PCT/CN2019/111219—ISAEPO—Jul. 15, 2020.
Supplementary European Search Report—EP20878004—Search Authority—Munich—Jul. 25, 2023.

\* cited by examiner

METHODS AND APPARATUS TO FACILITATE REGIONAL PROCESSING OF IMAGES FOR UNDER-DISPLAY DEVICE DISPLAYS

DECLARATION OF RIGHT OF PRIORITY

This application is a National Phase entry of PCT Application No. PCT/CN2020/120789, entitled "METHODS AND APPARATUS TO FACILITATE REGIONAL PROCESSING OF IMAGES FOR UNDER-DISPLAY DEVICE DISPLAYS" and filed on Oct. 14, 2020, which claims priority to PCT Application No. PCT/CN2019/111219, entitled "METHODS AND APPARATUS TO FACILITATE REGIONAL PROCESSING OF IMAGES FOR UNDER-DISPLAY DEVICE DISPLAYS" and filed on Oct. 15, 2019, both of which are expressly incorporated by reference herein in their entirety.

TECHNICAL FIELD

The present disclosure relates generally to processing systems and, more particularly, to one or more techniques for display or graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution.

Portable electronic devices, including smartphones and wearable devices, may present graphical content on a display. However, in light of various objectives that have surfaced, including achieving increased screen-to-body ratios, for example, there has developed an increased need for presenting graphical content on displays having regions with different pixel densities.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a display processor, a display processing unit (DPU), a graphics processing unit (GPU), or a video processor. The apparatus can identify a subsection of a set of frame layers, the identified subsection corresponding to a lower pixel density region, relative to at least one other region, of a display. The apparatus can also blend first pixel data for each frame layer corresponding to the identified subsection to generate second pixel data. Further, the apparatus can populate a buffer layer based on the second pixel data. Additionally, the apparatus can blend pixel data from the set of frame layers and the buffer layers to generate a blended image. The apparatus can also transmit the blended image for presentment via the display.

In some examples, the apparatus may blend the pixel data by masking the first pixel data for each frame layer corresponding to the identified subsection with the second pixel data of the buffer layer. In some examples, the apparatus may mask the first pixel data by setting the buffer layer as a highest layer of the frame layers, and setting a transparency of the buffer layer to zero. In some examples, the apparatus may generate the second pixel data by blending the first pixel data for each frame layer corresponding to the identified subsection to generate a blended subsection, downscaling the blended subsection to generate a downscaled subsection, and remapping pixel data from the downscaled subsection to the identified subsection to generate the second pixel data. In some examples, the apparatus may generate the second pixel data by transmitting the first pixel data for each frame layer corresponding to the identified subsection to a graphics processing unit (GPU), where the blending of the first pixel data, the downscaling of the blended subsection, and the remapping of the pixel data are performed by the GPU, and the method further comprises receiving the second pixel data from the GPU. In some examples, the second pixel data may include duplicate pixel data, the duplicate pixel data being in locations corresponding to non-valid pixel locations of the display. In some examples, the apparatus may perform the identifying of the subsection, the creating of the buffer layer, the blending of the pixel data, and the transmitting of the blended image via a display processor. In some examples, the set of frame layers may be received from at least one application. In some examples, the identified subsection is above at least one of an under-display camera, an under-display fingerprint reader, or other under-display device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
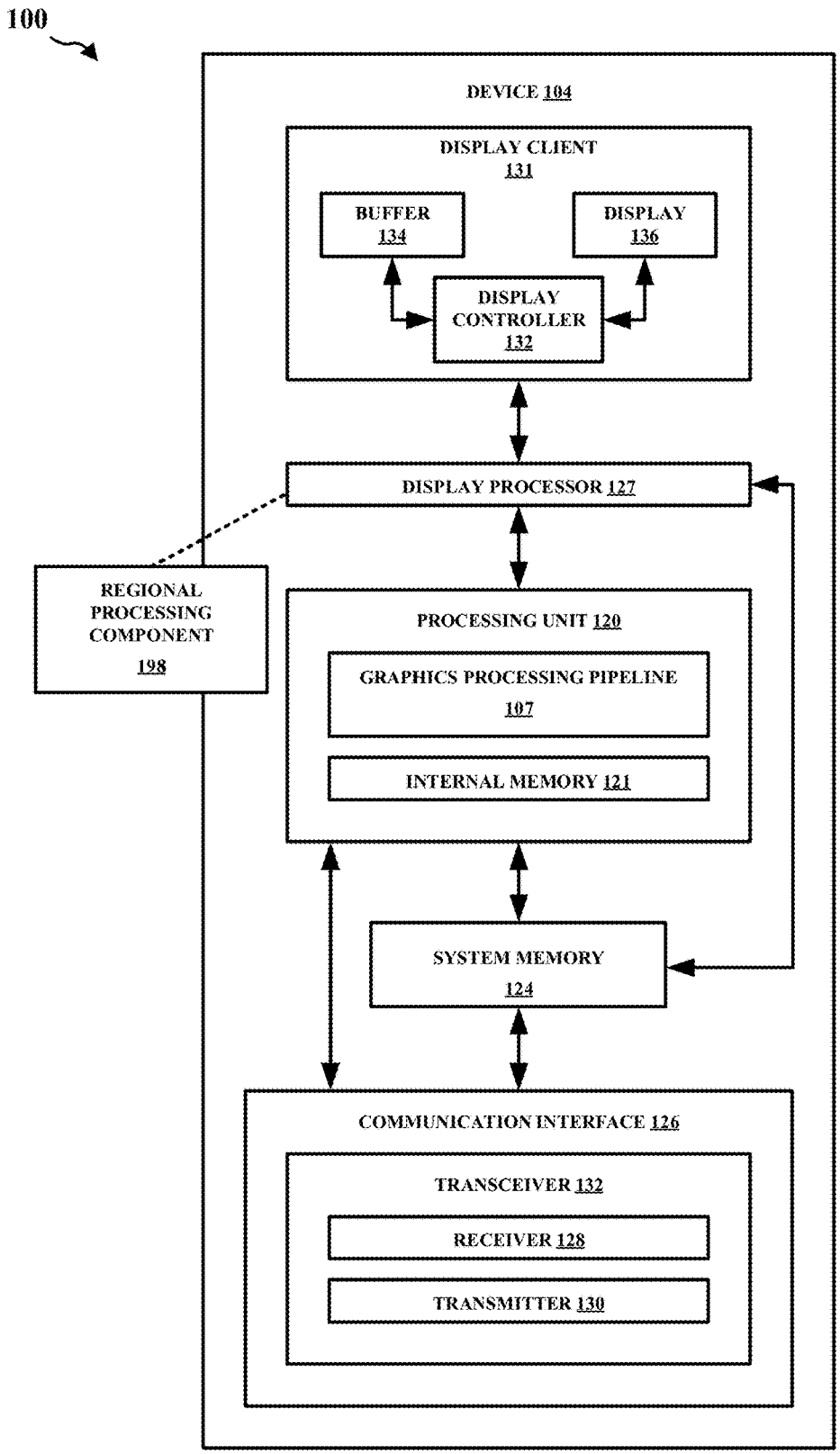
FIG. 1 is a block diagram that illustrates an example content generation system, in accordance with one or more techniques of this disclosure.

In general, examples disclosed herein provide techniques for improving visual quality of display images presented via a display including regions with different pixel densities. For example, a region of the display positioned above an under-display device may include a relatively lower pixel density. Example techniques disclosed herein facilitate regional processing of images for displays including under-display devices, such as an under-display camera, an under-display fingerprint reader, etc. In some examples, a display processor may perform compositing (or blending) of pixel data from different frame layers to generate a display image for presentment via the display. As used herein, a frame layer (sometimes referred to as a "layer") refers to a layer that can be combined with one or more other frame layers into a single layer (e.g., the display image).

To facilitate improving visual quality of the display image, disclosed techniques include identifying subsections of the one or more frame layers that correspond to the relatively lower pixel density region. For example, disclosed techniques may identify pixel data from each of the one or more frame layers that correspond to the same relatively lower pixel density region. Disclosed techniques may then populate a buffer layer based on processing of the identified subsections. For example, the display processor may identify pixel data associated with each of the one or more frame layers that corresponds to the relatively lower pixel density region and then generate a blended image based on the identified pixel data. In some examples, disclosed techniques may then perform post-processing techniques on the blended image to facilitate improving visual quality of the blended image based on characteristics of the relatively lower pixel density region of the display. For example, disclosed techniques may perform downscaling on the blended image to generate a downscaled image and may then perform remapping of the pixel data of the downscaled image based on the one or more characteristics of the relatively lower pixel density region of the display. In some examples, remapping the pixel data includes mapping each pixel of the downscaled image to valid pixels of the relatively lower pixel density region of the display.

As used herein, a valid pixel is a location (e.g., a display pixel) of the display that is capable of displaying pixel data. In contrast, a non-valid pixel is a location of the display that is incapable of displaying pixel data. For example, to accommodate the functionality of an under-display device, the region of the display above the under-display device may include a combination of locations that are capable of displaying pixel data (e.g., valid pixels) and locations that are incapable of displaying pixel data (e.g., a transparent region). It should be appreciated that in some examples, a valid pixel may also be transparent (e.g., a location of the display that is capable of displaying pixel data and that appears transparent).

In some examples, after the remapped image is generated, disclosed techniques may populate a buffer layer with the pixel data from the remapped image. In some examples, disclosed techniques may create the buffer layer as having a same or similar size as the region of the display having the relatively lower pixel density (e.g., the region of the display above the under-display device). Disclosed techniques may also assign the buffer layer with a maximum z-order among the different frame layers so that the buffer layer is the top layer among the frame layers.

Disclosed techniques may then perform blending of the frame layers and the buffer layer to generate a display image. It should be appreciated that the display image may include pixel data for regions of the display associated with a first pixel density and pixel data for regions of the display associated with a second pixel density (e.g., the relatively lower pixel density region).

Accordingly, example techniques disclosed herein facilitate improving visual quality of the display image by improving the visual quality of the regions of the display associated with the relatively lower pixel density. Furthermore, disclosed techniques may offload the performing of the blending of the pixel data for the identified subsections of the one or more frame layers and the generating of the remapped image to a graphics processing unit (GPU).

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, examples disclosed herein provide techniques for regional processing of images for displays including under-display devices. Examples techniques may improve visual quality of a display image presented via a display including regions with different pixel densities and/or reduce the load of a processing unit (e.g., any processing unit configured to perform one or more techniques disclosed herein, such as a GPU, a DPU, and the like). For example, this disclosure describes techniques for graphics and/or display processing in any device that utilizes a display. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to content produced by one or more processes of a graphics processing pipeline. In some examples, as used herein, the term "graphical content" may refer to content produced by a processing unit configured to perform graphics processing. In some examples, as used herein, the term "graphical content" may refer to content produced by a graphics processing unit.

In some examples, as used herein, the term "display content" may refer to content generated by a processing unit configured to perform display processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120 and a system memory 124. In some examples, the device 104 can include a number of additional or alternative components, e.g., a communication interface 126, a transceiver 132, a receiver 128, a transmitter 130, a display processor 127, and a display client 131. Reference to the display client 131 may refer to one or more displays. For example, the display client 131 may include a single display or multiple displays. The display client 131 may include a first display and a second display. In further examples, the results of the graphics processing may not be displayed on the device, e.g., the first and second displays may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. In some examples, the device 104 may include a display processor, such as the display processor 127, to perform one or more display processing techniques on one or more frames generated by the processing unit 120 before presentment by the display client 131. The display processor 127 may be configured to perform display processing. For example, the display processor 127 may be configured to perform one or more display processing techniques on one or more frames generated by the processing unit 120. The display processor 127 may output image data to the display client 131 according to an interface protocol, such as, for example, the MIPI DSI (Mobile Industry Processor Interface, Display Serial Interface).

The display client 131 may be configured to display or otherwise present frames processed by the display processor 127. In some examples, the display client 131 may include one or more of: a liquid crystal display (LCD), a plasma display, an organic light emitting diode (OLED) display, a projection display device, an augmented reality display device, a virtual reality display device, a head-mounted display, or any other type of display device.

In the illustrated example of FIG. 1, the display client 131 includes a display controller 132, a buffer 134, and a display 136. The example display 136 includes a plurality of pixel elements for displaying image data. The display controller 132 may receive image data from the display processor 127 and store the received image data in the buffer 134. In some examples, the display controller 132 may output the image data stored in the buffer 134 to the display 136. Thus, the buffer 134 may represent a local memory to the display client 131. In some examples, the display controller 132 may output the image data received from the display processor 127 to the display 136.

Furthermore, as disclosed above, the display client 131 may be configured in accordance with MIPI DSI standards. The MIPI DSI standard supports a video mode and a command mode. In examples where the display client 131 is operating in video mode, the display processor 127 may continuously refresh the graphical content of the display client 131. For example, the entire graphical content may be refreshed per refresh cycle (e.g., line-by-line).

In examples where the display client 131 is operating in command mode, the display processor 127 may write the graphical content of a frame to the buffer 134. In some such examples, the display processor 127 may not continuously refresh the graphical content of the display client 131. Instead, the display processor 127 may use a vertical synchronization (Vsync) pulse to coordinate rendering and consuming of graphical content at the buffer 134. For example, when a Vsync pulse is generated, the display processor 127 may output new graphical content to the buffer 134. Thus, the generating of the Vsync pulse may indicate when current graphical content at the buffer 134 has been rendered.

Memory external to the processing unit 120, such as system memory 124, may be accessible to the processing unit 120. For example, the processing unit 120 may be configured to read from and/or write to external memory, such as the system memory 124. The processing unit 120 may be communicatively coupled to the system memory 124 over a bus. In some examples, the processing unit 120 and the system memory 124 may be communicatively coupled to each other over the bus or a different connection.

It should be appreciated that in some examples, the device 104 may include a content encoder/decoder configured to receive graphical and/or display content from any source, such as the system memory 124 and/or the communication interface 126. The system memory 124 may be configured to store received encoded or decoded content. In some examples, the content encoder/decoder may be configured to receive encoded or decoded content, e.g., from the system memory 124 and/or the communication interface 126, in the form of encoded pixel data. In some examples, the content encoder/decoder may be configured to encode or decode any content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory computer-readable storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device while remaining non-transitory in nature. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

In some examples, the graphical content from the processing unit 120 for display via the display client 131 is not static and may be changing. Accordingly, the display processor 127 may periodically refresh the graphical content displayed via the display client 131. For example, the display processor 127 may periodically retrieve graphical content from the system memory 124, where the graphical content may have been updated by the execution of an application (and/or the processing unit 120) that outputs the graphical content to the system memory 124.

It should be appreciated that while shown as separate components in FIG. 1, in some examples, the display client 131 (sometimes referred to as a "display panel") may include the display processor 127.

Referring again to FIG. 1, in certain aspects, the display processor 127 may be configured to operate functions of the display client 131. In some examples, the display processor 127 may perform post-processing of image data provided by the processing unit 120 and/or retrieved from the system memory 124. For example, the display processor 127 may include a regional processing component 198 to generate a display image for output to the display client 131 by performing compositing (or blending) of frame layers. In some examples, the regional processing component 198 may be configured to generate the display image based on different pixel densities of the display 136 of the display client 131. For example, the regional processing component 198 may be configured to identify a subsection of a set of frame layers, the identified subsection corresponding to a relatively lower pixel density region of a display. In some examples, the set of frame layers may be received from at least one application. The example regional processing component 198 may also be configured to perform blending of first pixel data for each frame layer corresponding to the identified subsection to generate second pixel data. Additionally, the example regional processing component 198 may be configured to populate a buffer layer based on the second pixel data. Further, the example regional processing component 198 may be configured to blend pixel data from the set of frame layers and the buffer layer to generate a blended image. The example regional processing component 198 may also be configured to transmit the blended image for presentment via the display.

In some examples, the regional processing component 198 may be configured to blend the pixel data by masking the first pixel data for each frame layer corresponding to the identified subsection with the second pixel data of the buffer layer. In some examples, the regional processing component 198 may be configured to mask the first pixel data by setting the buffer layer as a highest layer of the frame layers, and setting a transparency of the buffer layer to zero.

In some examples, the regional processing component 198 may be configured to generate the second pixel data by blending the first pixel data for each frame layer corresponding to the identified subsection to generate a blended subsection. The regional processing component 198 may also be configured to downscale the blended subsection to generate a downscaled subsection. Further, the regional processing component 198 may be configured to remap pixel data from the downscaled subsection to the identified subsection to generate the second pixel data.

In some examples, the regional processing component 198 may be configured to generate the second pixel data by transmitting the first pixel data for each frame layer corresponding to the identified subsection to a graphics processing unit (GPU). In some such examples, the blending of the first pixel data, the downscaling of the blended subsection, and the remapping of the pixel data may be performed by the GPU. Further, in some such examples the regional processing component 198 may be configured to receive the second pixel data from the GPU. In some examples, the second pixel data may include duplicate pixel data, the duplicate pixel data being in locations corresponding to non-valid pixel locations of the display.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

Figure 2:
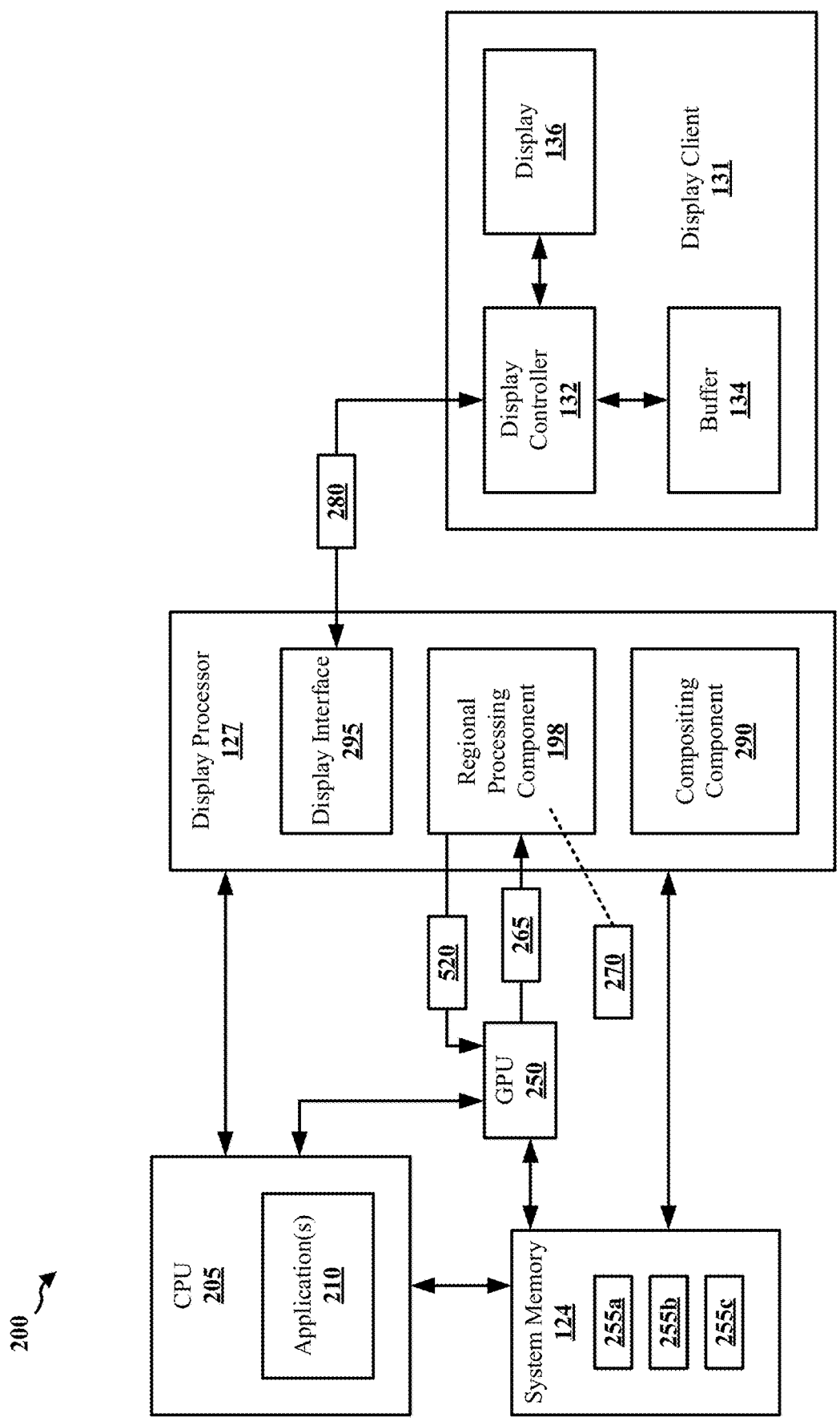
FIG. 2 is a block diagram illustrating an example central processing unit (CPU), an example GPU, an example system memory, an example display processor, and an example display client of the example content generation system of FIG. 1, in accordance with one or more techniques of this disclosure.

FIG. 2 is a block diagram 200 illustrating an example central processing unit (CPU) 205, an example GPU 250, the example system memory 124, the example display processor 127, and the example display client 131. It should be appreciated that aspects of the CPU 205 and/or the GPU 250 may be implemented by the processing unit 120.

Generally, the CPU 205 may execute various types of applications. Examples of the applications may include web browsers, e-mail applications, spreadsheets, video games, operating systems, etc., that generate viewable objects for display. In some examples, the system memory 124 may store instructions for execution of the one or more applications. The execution of an application on the CPU 205 may cause the CPU 205 to produce graphics content for image content for presentment. In some examples, the CPU 205 may transmit the graphics content to the GPU 250 for further processing based on instructions and/or commands that the CPU 205 transmits to the GPU 250.

The CPU 205 may communicate with the GPU 250 in accordance with a particular application processing interface (API). However, it should be appreciated that the disclosed techniques are not required to function with any API, and that the CPU 205 and the GPU 250 may utilize additional or alternative techniques for communication.

In the illustrated example of FIG. 2, the display processor 127 may be configured to composite the various image content stored in the system memory 124 for display via the display client 131. For example, the display processor 127 may be configured to retrieve the image content stored in the system memory 124 from one or more applications executing on the CPU 205. The display processor 127 may retrieve the image content and composite a frame for display. For example, image content from one application may occlude image content from another application, and the display processor 127 may ensure that the image content that is occluded does not interfere with the image content that is occluding. In general, compositing (or blending) refers to stitching image content from one or more applications into a single frame. The display processor 127 may then generate image signals that are transmitted to the display client 131 that cause the display client 131 to display the image content. In this way, the display client 131 may be configured to display the image content generated by the various applications.

In the illustrated example of FIG. 2, the CPU 205 is configured to execute one or more applications 210. The example display processor 127 includes the regional processing component 198, an example compositing component 290, and an example display interface 295.

The application 210 may be any application that utilizes the functionality of the GPU 250. For example, the application 210 may be a graphical user interface (GUI) application, an operating system, a portable mapping application, an artistic application, a video game application, or another type of software application that uses 2D and/or 3D graphics.

The application 210 may include one or more graphics rendering instructions that instruct the GPU 250 to render a GUI and/or a graphics scene. For example, the drawing instructions may include instructions that define a set of one or more graphics primitives to be rendered by the GPU 250. In some examples, the instructions may conform to a graphics application programming interface (API).

The GPU 250 may then generate image content 255a to 255c (collectively referred to herein as image content 255) for storage in the storage memory 124. The example display processor 127 may then retrieve the image content 255 from the storage memory 124 and perform image processing to generate a display image for display via the display client 131.

In the illustrated example, the image content 255 may be considered frame layers having a back most layer, a front most layer, and one or more intermediate layers that may or may not overlay on top of one another. For example, the first image content 255a may overlay and occlude part of the second image content 255b. In this example, the first image content 255a is a frame layer having a higher order than the second image content 255b. Thus, it should be appreciated that each image content 255 is associated with an order (referred to herein as a z-order setting).

In the illustrated example, the compositing component 290 may blend or stitch image content 255 to form a single display image. In some examples, the compositing component 290 may receive information indicating the order of image content 255 (e.g., the z-order of the frame layers 255) and information indicating the position were respective image content 255 is to be displayed via the display 136. In some examples, the compositing component 290 may receive the information from a driver executing on the CPU 205.

Based on the order information and the positioning information where respective image content 255 is to be displayed, the compositing component 290 may blend or stitch the frame layers. For example, if the first image content 255a occludes part of the second image content 255b, then for blending, the compositing component 290 may assign or receive an indication indicating that part of the first image content 255a that occludes part of the second image content 255b has an opacity (or alpha) value of one. Accordingly, on the portion of the display 136 where the first image content 255a is to be displayed, the compositing component 290 may cause the occluding part of the first image content 255a to be displayed rather than the occluded part of the second image content 255b. However, it should be appreciated that additional or alternative techniques for performing the blending and stitching may also be used.

The display interface 295 may be configured to cause the display client 131 to display image frames. The display interface 295 may output image data to the display client 131 according to an interface protocol, such as, for example, the MIPI DSI (Mobile Industry Processor Interface, Display Serial Interface).

Figure 3:
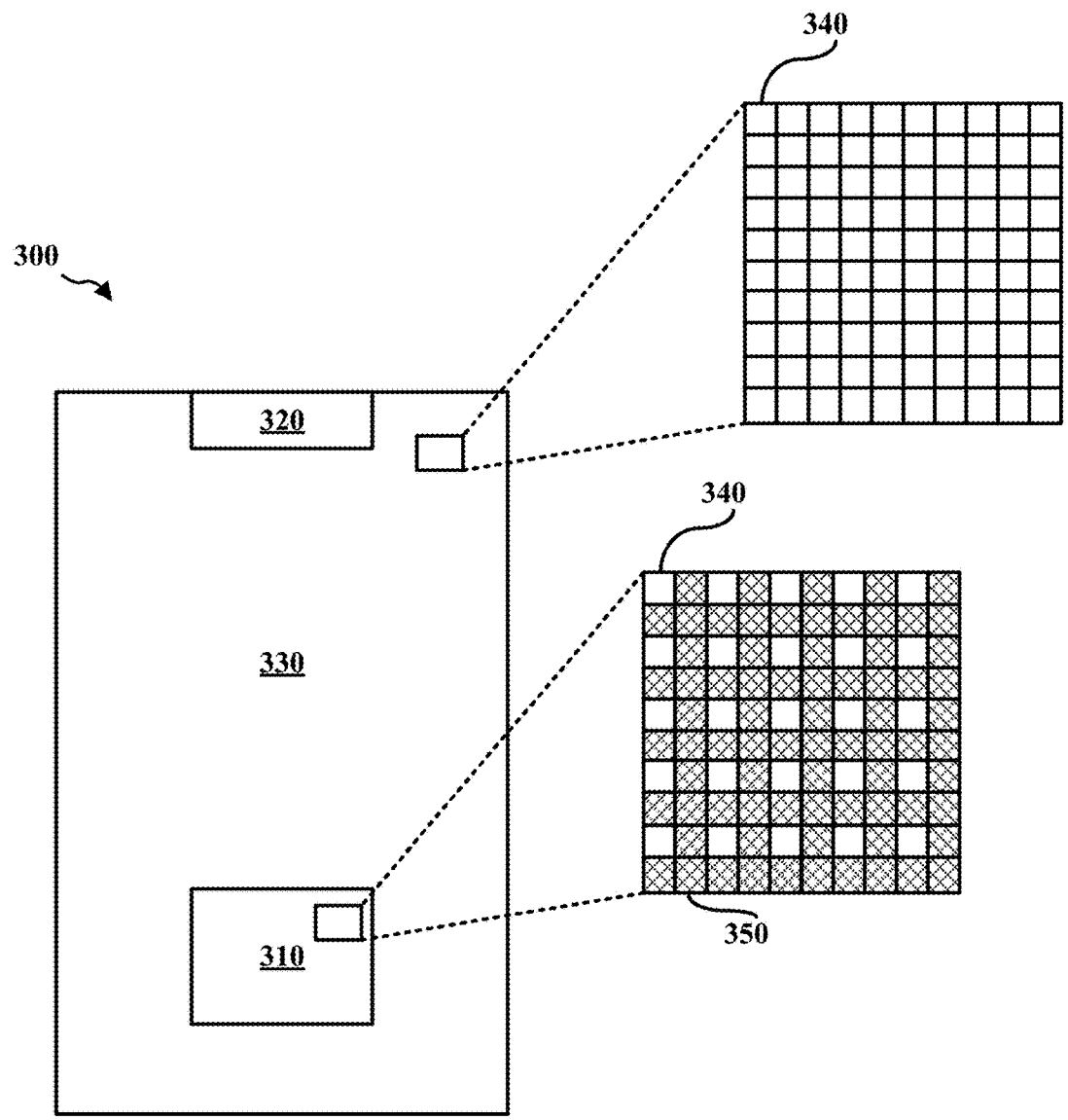
FIG. 3 illustrates an example display including regions having different pixel densities, in accordance with one or more techniques of this disclosure.

FIG. 3 illustrates an example display 300 including regions having different pixel densities. It should be appreciated that aspects of the display 300 may be implemented by the example display 136 of FIG. 1. In the illustrated example, the display 300 is generally associated with a first pixel density, such as 1440×4680 pixels. However, to facilitate functionality of under-display devices, such as an under-display camera, an under-display fingerprint reader, etc., the display 300 may include regions with transparent displays. For example, a 2×2 portion of the display 300 that is positioned above an under-display device may include one valid pixel that is capable of presenting pixel data and three non-valid pixels that are not capable of presenting pixel data. Thus, it should be appreciated that an image that is displayed via some such displays (e.g., the example display 300) may display a subset of the pixel data and discard the remaining pixel data. For example, in the above example, regions of the display 300 associated with the transparent display may display pixel data for one out four pixels of an image and discard the pixel data for the remaining three out of four pixels of the image.

In the illustrated example of FIG. 3, the display 300 includes a first region 310 (e.g., a portion of the display 300 that is positioned above an under-display fingerprint reader) and a second region 320 (e.g., a portion of the display 300 that is positioned above an under-display camera) are associated with relatively lower pixel densities than a third region 330 of the display 300 not associated with an under-display device. For example, a 10×10 portion of the first region 310 includes a first set of pixels that are valid pixels 340 and a second set of pixels that are non-valid pixels 350. As shown in FIG. 3, one out of four pixels are valid pixels 340 and the remaining three out of four pixels are non-valid pixels 350. In contrast, a 10×10 portion of the third region 330 may include all valid pixels 340. Thus, the first region 310 and the second 320 of the display 300 may be associated with relatively lower pixel densities than the third region 330. However, it should be appreciated that other combinations of valid pixels and non-valid pixels may also be used in a relatively lower pixel density region.

Figure 4:
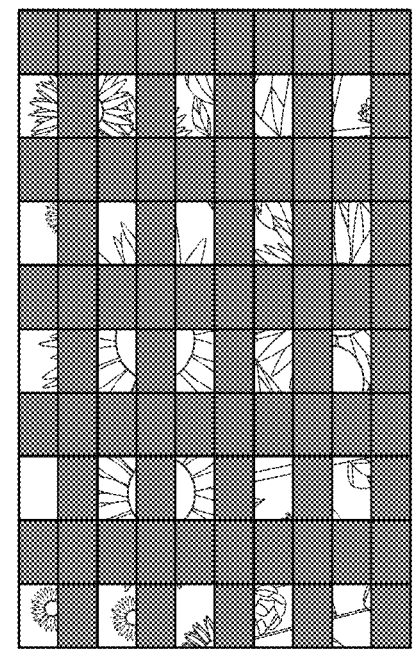
FIG. 4 illustrates an example image displayed via a lower pixel density region, in accordance with one or more techniques of this disclosure.
Figure 4:
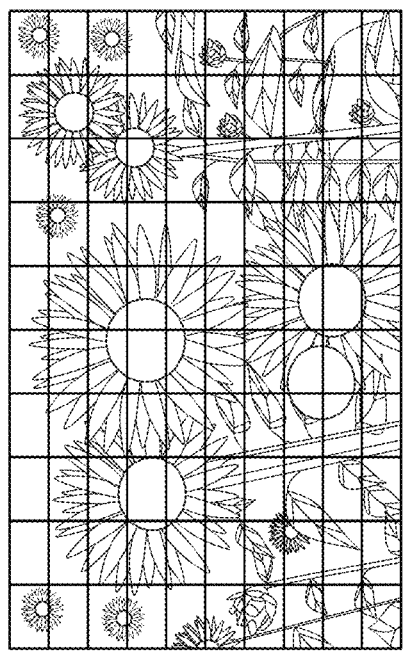

For example, FIG. 4 illustrates a first image 410 and a second image 420. The first image 410 depicts how an image may be displayed via a region of the display 300 including all valid pixels 340 (e.g., the third region 330). The second image 420 depicts how an image may be displayed via a region of the display 300 including a relatively lower pixel density (e.g., the first region 310 including one valid pixel 340 for every three non-valid pixels 350).

Thus, it should be appreciated that images displayed via the relatively lower pixel density regions 310, 320 may be associated with relatively poor visual quality. Furthermore, as there may be fewer valid pixels in some such regions, the brightness of the image corresponding to the regions 310, 320 may also be relatively reduced compared to the third region 330.

Referring again to FIG. 3, it should be appreciated that the first region 310 and the second region 320 of the display 300 may be relatively small regions compared to the overall size of the display 300. For example, the display 300 may be a 1440×4680 display while the first region 310 may be a 200×200 portion of the display 300 and the second region 320 may be a 100×200 portion of the display 300.

Figure 5:
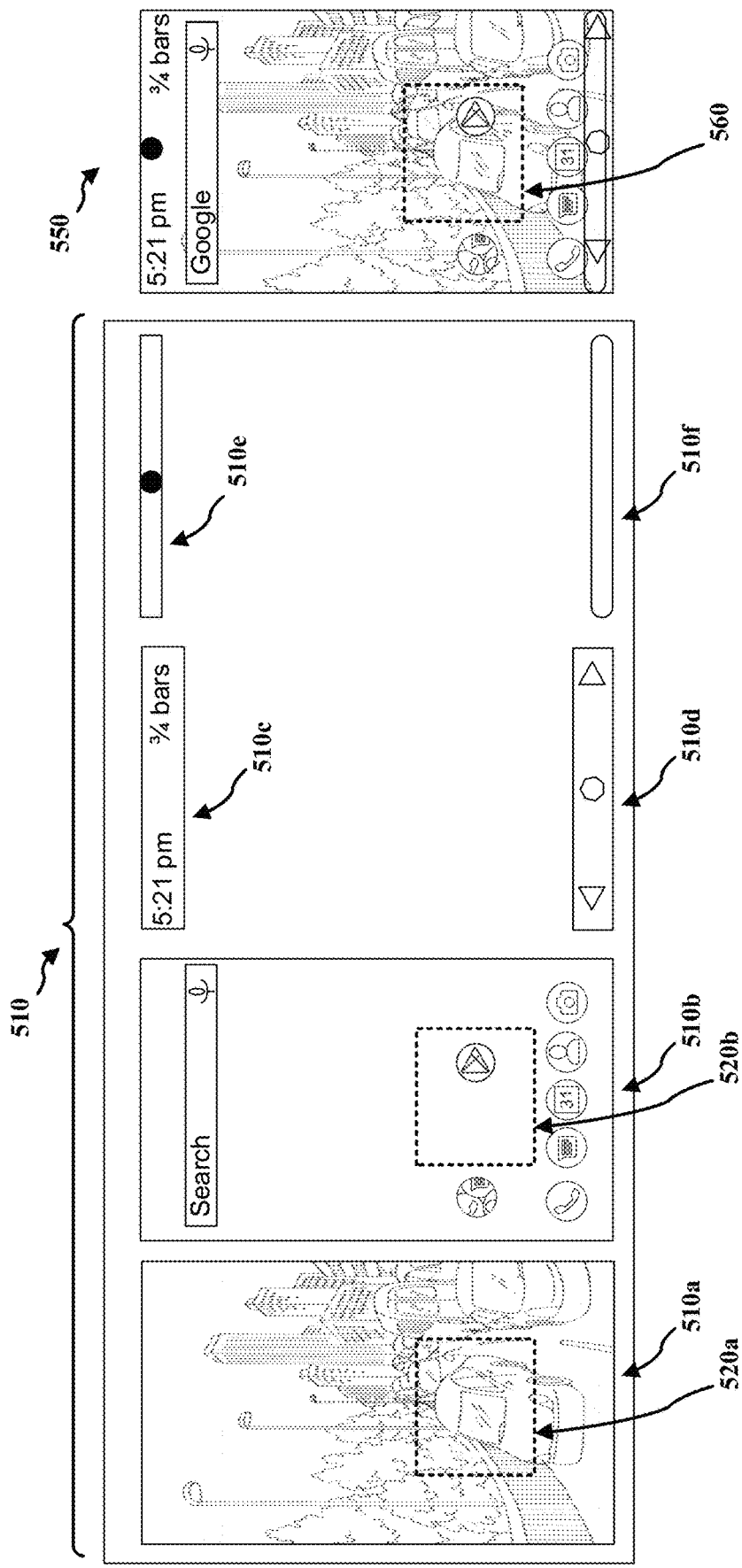
FIG. 5 illustrates an example blended image, in accordance with one or more techniques of this disclosure.

FIG. 5 illustrates an example set of frame layers 510 and an example display image 550. The set of frame layers 510 may be generated by the CPU 205 and/or the GPU 250. In the illustrated example, aspects of the frame layers 510 correspond to the image content 255, and aspects of the display image 550 correspond to the display image 280.

In the illustrated example, the set of frame layers 510 includes a first frame layer 510a that represents a wallpaper, a second frame layer 510b that represents launcher elements, a third frame layer 510c that represents a status bar, a fourth frame layer 510d that represents a navigation bar, a fifth frame layer 510e that represents a rounded top portion, and a sixth frame layer 510f that represents a rounded bottom portion. In the illustrated example, each of the frame layers 510 may be generated (via the GPU 250) by the same application 210 and/or by two or more applications 210.

In the illustrated example, each frame layer 510 is associated with a respective z-order setting. For example, each of the size frame layers 510 may be associated with a z-order setting between one and six. In some such examples, a z-order setting of one may indicate a front most layer and a z-order setting of six may indicate a back most layer. In the illustrated example, it should be appreciated that the first frame layer 510a representing the wallpaper is assigned a z-order setting of six indicative of the first frame layer 510a being a back most layer. In contrast, the example sixth frame layer 510f (representative of the rounded bottom portion) may be assigned a z-order setting of one to indicate that the sixth frame layer 510f is the front most layer. The remaining frame layers 510b to 510e may be intermediate frame layers that are positioned between the first frame layer 510a and the sixth frame layer 510f.

As mentioned above, the display processor 127 may be configured to blend or stitch the different frame layers (e.g., the frame layers 510) to generate the display image 550. For example, the compositing component 290 may retrieve the set of frame layers 510 from the system memory 124 and then perform blending and stitching of the pixel data to generate the display image 550.

However, as mentioned above, in some examples, the display 136 may include regions having different pixel densities (e.g., the regions 310, 320 of the example display 300). In some such examples, the overall visual quality of the user experience of a user viewing the display image 500 may be reduced. In particular, when the user is viewing parts of the display that correspond to the regions of relatively lower pixel density, the user may be able to identify the reduced visual quality of the display image. For example, the display 136 may include a region that corresponds to a portion of the display that is above an under-display fingerprint reader. In the illustrated example of FIG. 5, the display image 550 includes a region 560 that corresponds to the portion of the display that is above an under-display fingerprint reader and that, thus, may be associated with a relatively lower pixel density.

Example techniques disclosed herein facilitate improving the overall visual quality of the display image by performing regional processing of frame layers corresponding to the region(s) of the display associated with the relatively lower pixel density. For example, referring again to FIG. 2, the display processor 127 includes the regional processing component 198. In the illustrated example, the regional processing component 198 may be configured to perform regional processing of the image content 255 prior to the generating of the display image.

In the illustrated example, the regional processing component 198 may be configured to receive the image content 255 from the system memory 124. The example regional processing component 198 may also be configured to identify portions of the image content 255 that correspond to a region of relatively lower pixel density. For example, referring to the example set of frame layers 510 of FIG. 5, the regional processing component 198 may be configured to identify a first cropped area 520a of the first frame layer 510a that corresponds to the region 560 (e.g., the portion of the first frame layer 510a that, when presented via the display 136, would be above the region 560). The example regional processing component 198 may also be configured to identify a second cropped area 520b of the second frame layer 510b that corresponds to the region 560. It should be appreciated that the remaining frame layers 510c, 510d, 510e, 510f of the set of frame layers 510 do not include cropped areas that overlap with the region 560. It should be appreciated that the cropped areas 520 may have respective sizes that are the same or similar in size to the region 560. For example, if the region 560 is a 200×200 region, then each of the cropped areas 520 may also be 200×200 or a similar size.

Referring back to FIG. 2, the regional processing component 198 may then transmit the pixel data for the cropped areas 520 to the GPU 250 for processing. For example, the GPU 250 may perform compositing of the pixel data for the cropped areas 520 to generate a blended image using the pixel data for the cropped areas 520. In some examples, the GPU 250 may utilize the same or similar techniques for generating the blended image as the compositing component 290 of the display processor 127. For example, the GPU 250 may generate the blended image based on the respective z-order settings of the corresponding frame layers so that any occluded portions are maintained.

Figure 6:
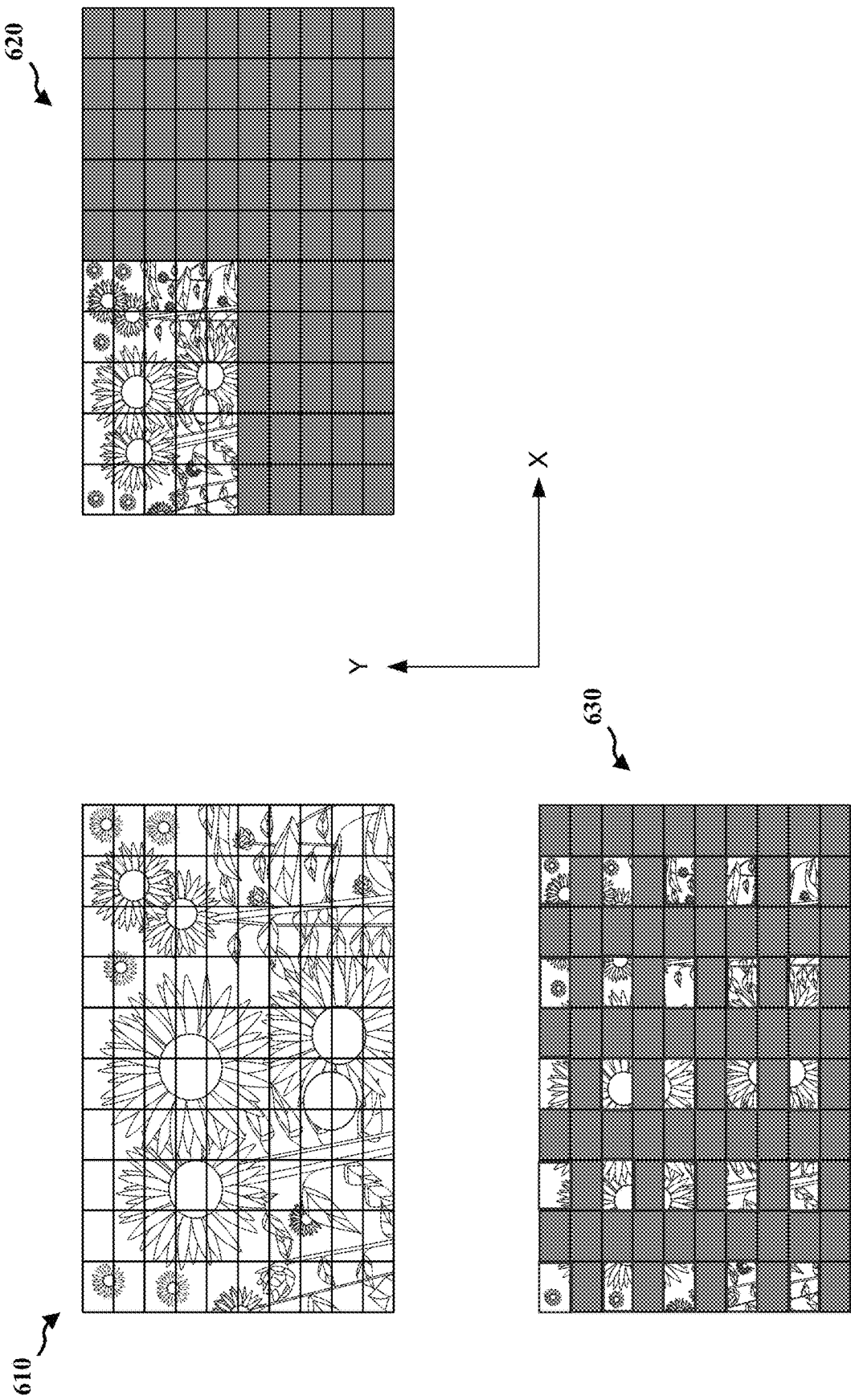
FIG. 6 illustrates an example original image, an example downscaled image, and an example remapped image with respect to an example lower pixel density region, in accordance with one or more techniques of this disclosure.

FIG. 6 illustrates an example blended image 610 that may be generated by the GPU 250. As shown in FIG. 6, the blended image 610 is a composited image based on cropped areas of different frame layers. For example, the blended image 610 may correspond to a blended and stitched image based on the cropped areas 520 identified and provided by the display processor 127 to the GPU 250. In the illustrated example, the blended image 610 maintains the same (or similar) dimensions as the cropped areas 520 (e.g., the blended image 610 is a 200×200 area).

Referring again to FIG. 2, in the illustrated example, the GPU 250 may then perform post-processing on the blended image 610. For example, the GPU 250 may perform a downscaling operation to reduce the size of the blended image. FIG. 6 illustrates an example downscaled image 620 that the GPU 250 may generate by applying a one-half downscale process to the blended image 610. As shown in FIG. 6, the downscaled image 620 is half the size of the blended image 610 in each of the x-axis and the y-axis, and the overall size of the downscaled image 620 is one-fourth the size of the blended image 610.

More specifically, as an illustrative example, the blended image 610 can be a 10×10 image, resulting in a total of 100 pixels. In some such examples, the downscaled image 620 is a 5×5 image, resulting in a total twenty-five pixels. As discussed above, a region of relatively lower pixel density may include a set of valid pixels 340 and a set of non-valid pixels 350. For example, the first region 310 of the display 300 includes one valid pixel 340 for three non-valid pixels 350. Thus, a 100 pixel area would include twenty-five valid pixels 340 and seventy-five non-valid pixels 350.

Referring back to FIG. 2, the example GPU 250 may then perform remapping of the pixel data of the downscaled image. For example, the GPU 250 may map pixels of the downscaled image 620 to locations of valid pixels. FIG. 6 illustrates an example remapped image 630 based on the downscaled image 620. For example, the GPU 250 may map the twenty-five pixels of the downscaled image 620 to the locations corresponding to the twenty-five valid pixels 340 of the region 310 of the display 300. For example, the GPU 250 may map each pixel of the downscaled image 620 to the top-left pixel of every 2×2 group of the remapped image 630. It should be appreciated that the overall dimensions of the remapped image 630 may be the same (or similar) to the dimensions of the blended image 610.

It should be appreciated that by downscaling the blended image and then remapping the downscaled image to the locations corresponding to the valid pixels 340, the disclosed techniques improve the visual quality of an image presented via the region associated with the relatively lower pixel density. For example, compared to examples in which the display drops pixel data for three-out-of-four pixels (as shown in the second image 420 of FIG. 4) and, thus, three-fourths of the display image is missing, disclosed techniques maintain the pixel data for the display image, and use the distributed locations of the valid pixels to display the overall display image.

Figure 7:
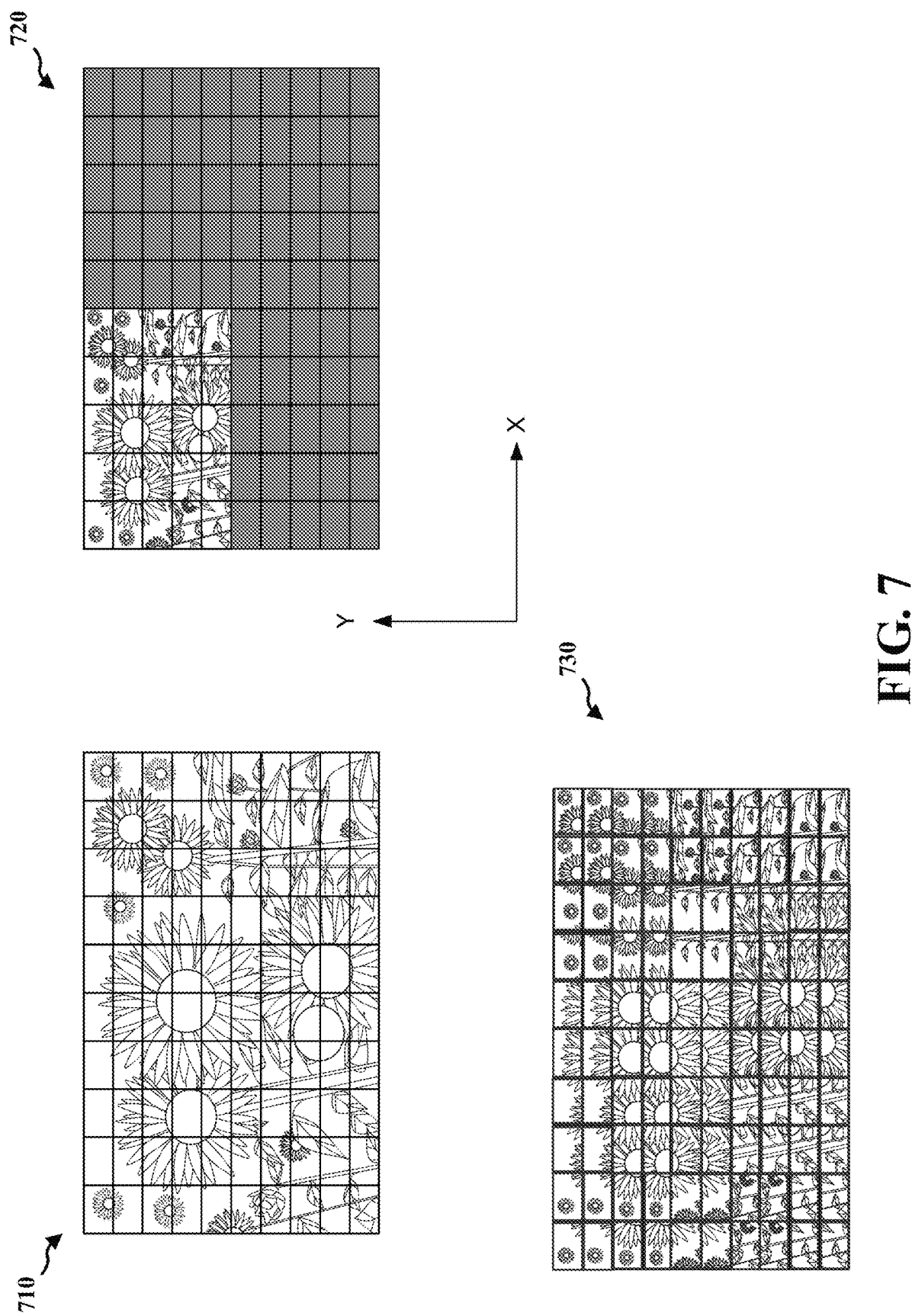
FIG. 7 illustrates an example original image, an example downscaled image, and another example remapped image with respect to an example lower pixel density region, in accordance with one or more techniques of this disclosure.

In some examples, the GPU 250 may populate the locations of the remapped image corresponding to non-valid pixels 350 with duplicate (or redundant) data. FIG. 7 illustrates an example blended image 710 and an example downscaled image 720 that correspond to the blended image 610 and the downscaled image 620 of FIG. 6, respectively. FIG. 7 also illustrates an example remapped image 730 in which each respective pixel of the downscaled image 720 is copied into each pixel of every 2×2 group of the remapped image 730. By duplicating the pixel data to locations corresponding to non-valid pixels, the GPU 250 may improve the likelihood of pixel data being shown at the locations of each valid pixel 340. For example, when the display client 131 is displaying pixel data for a region associated with the relatively lower pixel density, the display client 131 may be configured to select pixel data from any pixel of the 2×2 group. In some examples, the display client 131 may select a first pixel from the 2×2 group and if pixel data for the selected first pixel is not valid, the display client 131 may select a select second pixel from the 2×3 group for presentment.

However, it should be appreciated that in some examples, when generating the remapped image, the GPU 250 may populate the locations of the remapped image corresponding to non-valid pixels 350 with additional or alternative data. For example, the GPU 250 may populate the respective locations with a solid color (e.g., a black color pixel), a mixed color, a color based on one or more neighboring pixels, etc.

In some examples, the GPU 250 may apply a screen mask to the remapped image. In some examples, the screen mask may define visible areas and non-visible areas of the display that may be based on an irregular shape of the display (or the region of the display). For example, in FIG. 3, the regions 310, 320 associated with the relatively lower pixel density is shown as a rectangular area. However, in some examples, one or more regions associated with the relatively lower pixel density may be associated with an irregular shape (e.g., due to, for example, a cutout (or notch), a circular-shaped area, etc.). In some such examples, the GPU 250 may apply a screen mask to the remapped image to facilitate, for example, reducing the amount of image data being transmitted via communication buses.

Figure 8:
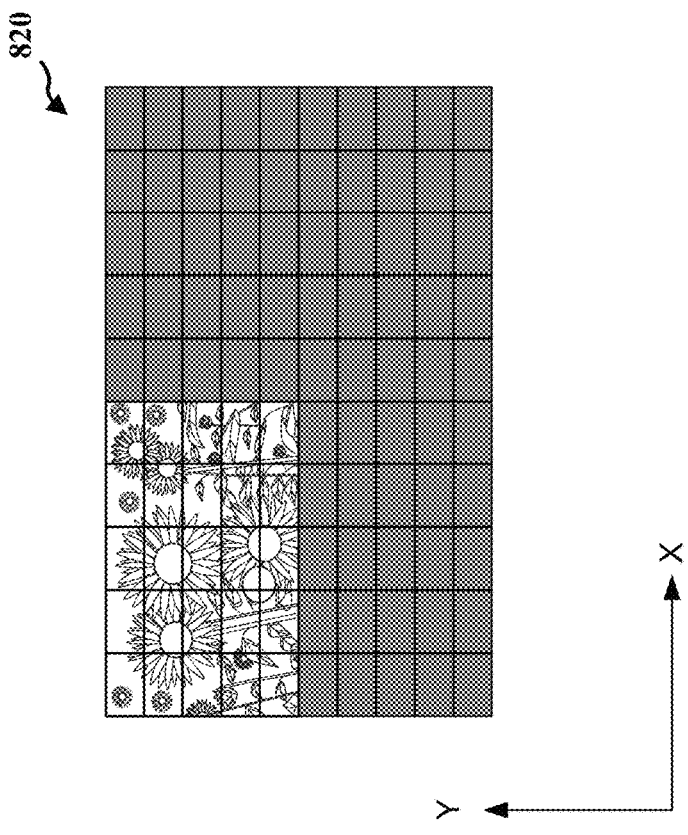
FIG. 8 illustrates an example original image, an example downscaled image, and another example remapped image with respect to another example lower pixel density region, in accordance with one or more techniques of this disclosure.
Figure 8:
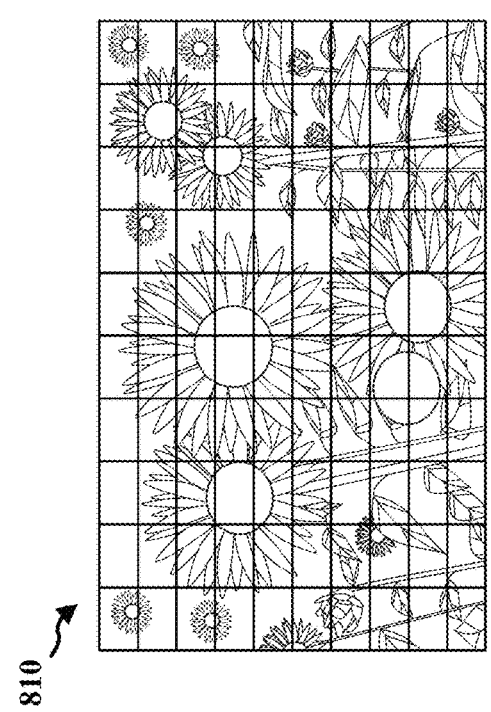
Figure 8:
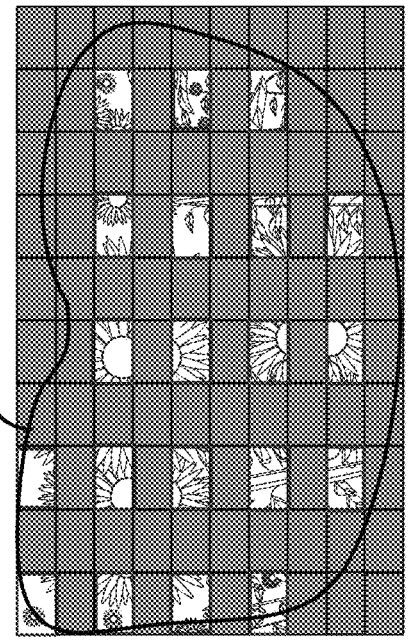

FIG. 8 illustrates an example blended image 810 and an example downscaled image 820 that correspond to the blended images 610, 710 and the downscaled images 620, 720 of FIGS. 6 and 7, respectively. FIG. 8 also illustrates an example remapped image 830 in which a screen mask 840 is applied to the remapped image 830. In the illustrated examples, pixel data for locations of the remapped image 830 corresponding to valid pixels 340 that are within the boundaries of the screen mask 840 are retained, while pixel data for locations of the remapped image 830 corresponding to non-valid pixels 350 that are inside of the screen mask 840 are discarded. In the illustrated example, if the screen mask 840 overlaps with a valid pixel location and a threshold percentage of the valid pixel location is within the screen mask 840, then the corresponding pixel data is retained in the remapped image 830.

It should be appreciated that additional or alternative techniques for performing the downscaling and/or the remapping may be performed. For example, in some examples, the downscaling operation may be based on the quantity of valid pixel locations in the region so that the quantity of pixels in the downscaled image is the same (or similar) to the quantity of valid pixel locations.

Referring back to FIG. 2, in the illustrated example, after generating the remapped image, the GPU 250 transmits the remapped image to the regional processing component 198. For example, the GPU 250 may transmit pixel data for a remapped image 265 to the regional processing component 198. It should be appreciated that the pixel data for the remapped image 265 may correspond to the remapped images 630, 730, 830 of FIGS. 6, 7, and/or 8.

In the illustrated example, the regional processing component 198 also creates a buffer layer 270 that is different than the frame layers (or image content 255). In the illustrated example, the buffer 270 may be a cache buffer layer that is the same size (or similar size) as the region of the relatively lower pixel density. For example, the buffer layer 270 may have a same size (e.g., a 200×200 area) as the first region 310. The example regional processing component 198 may also assign the buffer layer 270 with the highest order z-order setting of the set of frame layers. For example, the regional processing component 198 may assign the buffer layer 270 with a z-order setting of one, and re-assign the other frame layers to a lower z-order setting (e.g., the regional processing component 198 may re-assign the first frame layer 510a to a z-order setting of two, etc.).

In some examples, the regional processing component 198 may also set a transparency of the buffer layer to zero (or zero percent). Additionally or alternatively, the regional processing component 198 may assign an alpha value of one to the buffer layer 270 so that the pixel data has maximum opacity.

In the illustrated example, the regional processing component 198 may populate the buffer layer 270 with the remapped image 265 received from the GPU 250. In this manner, the regional processing component 198 facilitates providing regional processing of the display image (e.g., of the cropped areas 520 of the frame layers 510). Furthermore, by offloading the processing of the cropped areas 520 to the GPU 250, the display processor 127 is able to reduce the processing workload incurred by performing compositing by the display processor 127.

The example regional processing component 198 may then provide the populated buffer layer 270 to the compositing component 290, along with the image content 255, to perform blending and stitching of the layers 255, 270. The compositing component 290 may then provide the display interface 295 a display image 280 corresponding to the image content 255 provided by the application(s) 210 and the buffer layer 270. The display interface 295 may then provide the display image 280 to the display client 131 for presentment.

It should be appreciated that in some examples, the display processor 127 may provide a screen mask to the display client 131. For example, the display processor 127 may provide the screen mask 840 to the display client 131 to facilitate the display client 131 in the presentment of the display image 280, including the pixels of the region that may be located in non-visible areas (e.g., due to the screen mask). In some examples, the screen mask 840 may be pre-generated (or hard-coded) at the display client 131.

It should be appreciated that in some examples, the performing of the downscaling of the blended image and the remapping of the downscaled image may be examples of post-processing techniques that may be applied to the blended image. In some examples, disclosed techniques may include performing additional or alternative post-processing techniques, such as brightness adjustment. Thus, it should be appreciated that disclosed techniques are adaptable and can be changed. In contrast, the display panel manufacturing process may be static or difficult to adapt. Accordingly, it should be appreciated that hardware-based solutions for improving visual quality may not be able to provide adaptable solutions.

Furthermore, while the above disclosure describes the GPU 250 performing the post-processing techniques (e.g., the downscaling of the blended image and the remapping of the downscaled image), it should be appreciated that in some examples, one or more aspects of the post-processing techniques may be performed by the display processor 127. For example, the GPU 250 may perform the generating of the blended image and then provide the blended image to the display processor 127. The display processor 127 may then populate the buffer layer 270 with the blended image and then perform the example downscaling and the example remapping for the pixel data of the buffer layer 270. In some examples, the display processor 127 may populate the buffer layer 270 with the blended image and then instruct the GPU 250 to perform one or more post-processing techniques (e.g., the downscaling of the blended image, the remapping of the downscaled image, etc.). In some examples, the display processor 127 may perform certain ones of the post-processing techniques and instruct the GPU 250 to perform other ones of the post-processing techniques.

Figure 9:
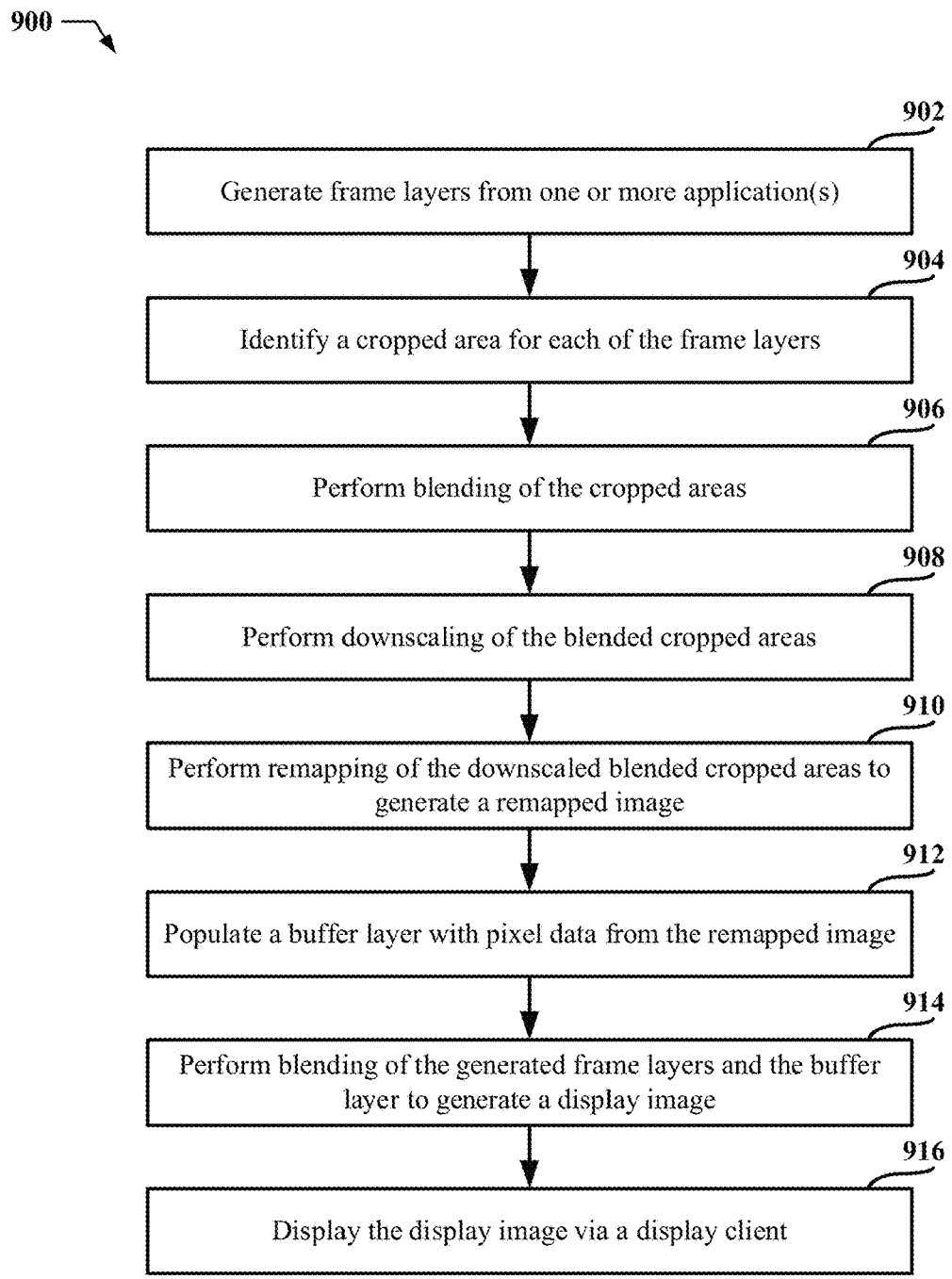
FIGS. 9 to 12 illustrate example flowcharts of example methods, in accordance with one or more techniques of this disclosure.

FIG. 9 illustrates an example flowchart 900 of an example method in accordance with one or more techniques of this disclosure. The method may be performed by an apparatus, such as the device 104 of FIG. 1, a DPU, a GPU, a video processor, and/or a component of the device 104, such as the display processor 127, the GPU 250, and/or the display client 131.

At 902, the apparatus may generate frame layers from one or more application(s), as described in connection with the examples of FIGS. 1 to 7 and/or 8. For example, one or more applications 210 may generate the example frame layers 255, 510.

At 904, the apparatus may identify a cropped area for each of the frame layers, as described in connection with the examples of FIGS. 1 to 7 and/or 8. For example, the display processor 127 may identify portions of the frame layers 255, 510 that correspond to the region 310, 520 associated with lower pixel densities.

At 906, the apparatus may perform blending of the cropped areas, as described in connection with the examples of FIGS. 1 to 7 and/or 8. For example, the GPU 250 may perform the blending of the pixel data associated with the cropped areas to generate the example blended images 610, 710, 810 of FIGS. 6, 7, and 8, respectively.

At 908, the apparatus may perform downscaling of the blended cropped areas, as described in connection with the examples of FIGS. 1 to 7 and/or 8. For example, the GPU 250 may perform the downscaling of the blended images 610, 710, 810 to generate the example downscaled images 620, 720, 820 of FIGS. 6, 7, and 8, respectively.

At 910, the apparatus may perform remapping of the downscaled blended cropped areas to generate a remapped image, as described in connection with the examples of FIGS. 1 to 7 and/or 8. For example, the GPU 250 may perform the remapping of the downscaled images 620, 720, 820 to generate the example remapped images 630, 730, 830 of FIGS. 6, 7, and 8, respectively.

At 912, the apparatus may populate a buffer layer with pixel data from the remapped image, as described in connection with the examples of FIGS. 1 to 7 and/or 8. For example, the display processor 127 may create the buffer layer 270. In some examples, the display processor 127 may set the buffer layer with a highest z-order layer. In some examples, the display processor 127 may set the buffer layer with a transparency of zero. The display processor 127 may populate the buffer layer with the pixel data from the remapped images 630, 730, 830.

At 914, the apparatus may perform blending of the generated frame layers and the buffer layer to generate a display image, as described in connection with the examples of FIGS. 1 to 7 and/or 8. For example, the display processor 127 may perform the blending of the frame layers 510 and the buffer layer 270 to generate the display image 280.

At 916, the apparatus may display the display image via a display client, as described in connection with the examples of FIGS. 1 to 7 and/or 8. For example, the display client 131 may facilitate presentment of the display image 280. Aspects of the displaying of the display image are described in connection with the example flowchart 1200 of FIG. 12.

Figure 10:
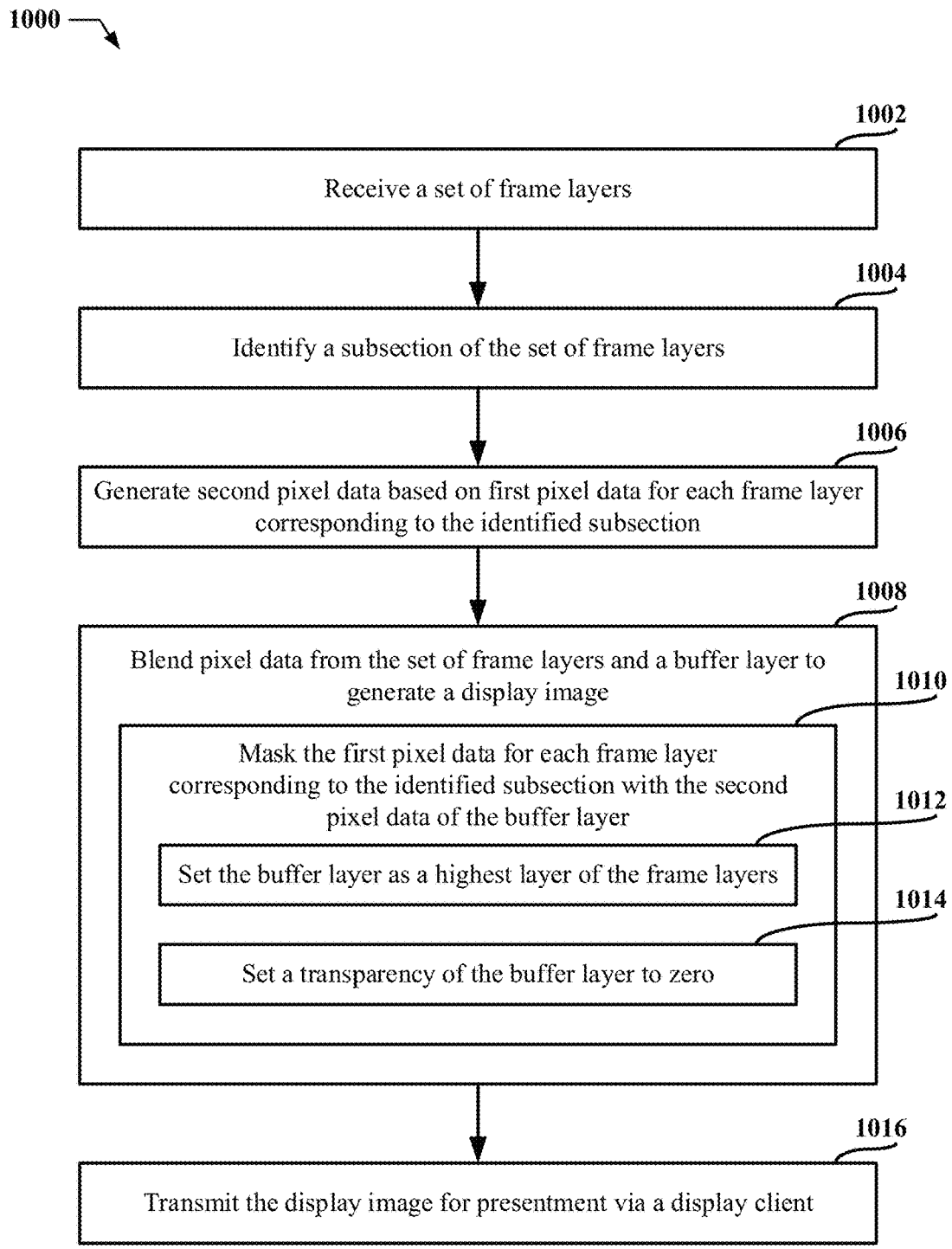

FIG. 10 illustrates an example flowchart 1000 of an example method in accordance with one or more techniques of this disclosure. The method may be performed by an apparatus, such as the device 104 of FIG. 1, the display processor 127 of FIGS. 1 and/or 2, a DPU, a GPU, and/or a video processor.

At 1002, the apparatus may receive a set of frame layers, as described in connection with the examples of FIGS. 1 to 7 and/or 8. For example, the display processor 127 may receive the example frame layers 255, 510 for compositing into a display image for presentment via the display client 131.

At 1004, the apparatus may identify a subsection of the set of frame layers, as described in connection with the examples of FIGS. 1 to 7 and/or 8. For example, the display processor 127 may identify the portions 520 of the frame layers 510 that correspond to the region(s) 310 of the display 136 associated with the relatively lower pixel density.

At 1006, the apparatus may generate second pixel data based on first pixel data for each frame layer corresponding to the identified subsection, as described in connection with the examples of FIGS. 1 to 7 and/or 8. For example, the display processor 127 may offload the generating of the remapped images 630, 730, 830 of FIGS. 6, 7, and/or 8, respectively, to the GPU 250. In some such examples, the display processor 127 may transmit the pixel data corresponding to the identified portions 520 of the frame layers 255, 510 (e.g., at 1004) to the GPU 250 and receive the pixel data correspond to the remapped images 630, 730, 730.

At 1008, the apparatus may blend pixel data from the set of frame layers and the buffer layer to generate a display image, as described in connection with the examples of FIGS. 1 to 7 and/or 8. For example, the display processor 127 may perform compositing of the frame layers received from the application(s) 210 (e.g., at 1002) and the buffer layer 270 to generate the display image 280.

In some examples, the apparatus may generate the display image by masking the identified portions of the frame layers 255, 510 (e.g., at 1004) using the pixel data corresponding to the buffer layer. For example, at 1010, the apparatus may mask the first pixel data for each frame layer corresponding to the identified subsection with the second pixel data of the buffer layer, as described in connection with the examples of FIGS. 1 to 7 and/or 8.

In some examples, the apparatus may facilitate the masking of the identified portions of the frame layers 255, 510 by setting, at 1012, the buffer layer as a highest layer of the frame layers, as described in connection with the examples of FIGS. 1 to 7 and/or 8. For example, each frame layer of the frame layers 255, 510 may be associated with a z-order layer. In some such examples, the apparatus may set the buffer layer as the highest z-order layer of the frame layers 255, 510 so that the pixel data of the buffer layer is positioned above the pixel data for the other frame layers. In some examples, the apparatus may facilitate the masking of the identified portions of the frame layers 255, 510 by, additionally or alternatively, setting, at 1014, the transparency of the buffer layer to zero, as described in connection with the examples of FIGS. 1 to 7 and/or 8. For example, the apparatus may set the transparency of the buffer layer to zero percent so that pixel data associated with the buffer layer is of a lower transparency percent than pixel data associated with the frame layers.

At 1016, the apparatus may transmit the display image for presentment via a display client, as described in connection with the examples of FIGS. 1 to 7 and/or 8. For example, the display processor 127 may transmit the display image 280 to the display client 131 for presentment.

It should be appreciated that in some examples, the display processor 127 may apply a screen mask to one or more regions of the display image prior to transmitting the display image 280 to the display client 131. For example, the display processor 127 may apply the screen mask 840 to the pixel data associated with the relatively lower pixel density regions (as shown in FIG. 8).

It should be appreciated that in some examples, the display processor 127 may additionally or alternatively apply post-processing techniques on the generated second pixel data. For example, the generating of the second pixel data may include generating a blended image, and the display processor 127 may further perform downscaling of the blended image and remapping of the downscaled blended image, and/or any additional or alternative post-processing techniques. Additionally or alternatively, the display processor 127 may receive the blended image (e.g., from the GPU 250) and transmit instructions to the GPU 250 to perform the one or more post-processing techniques.

Figure 11:
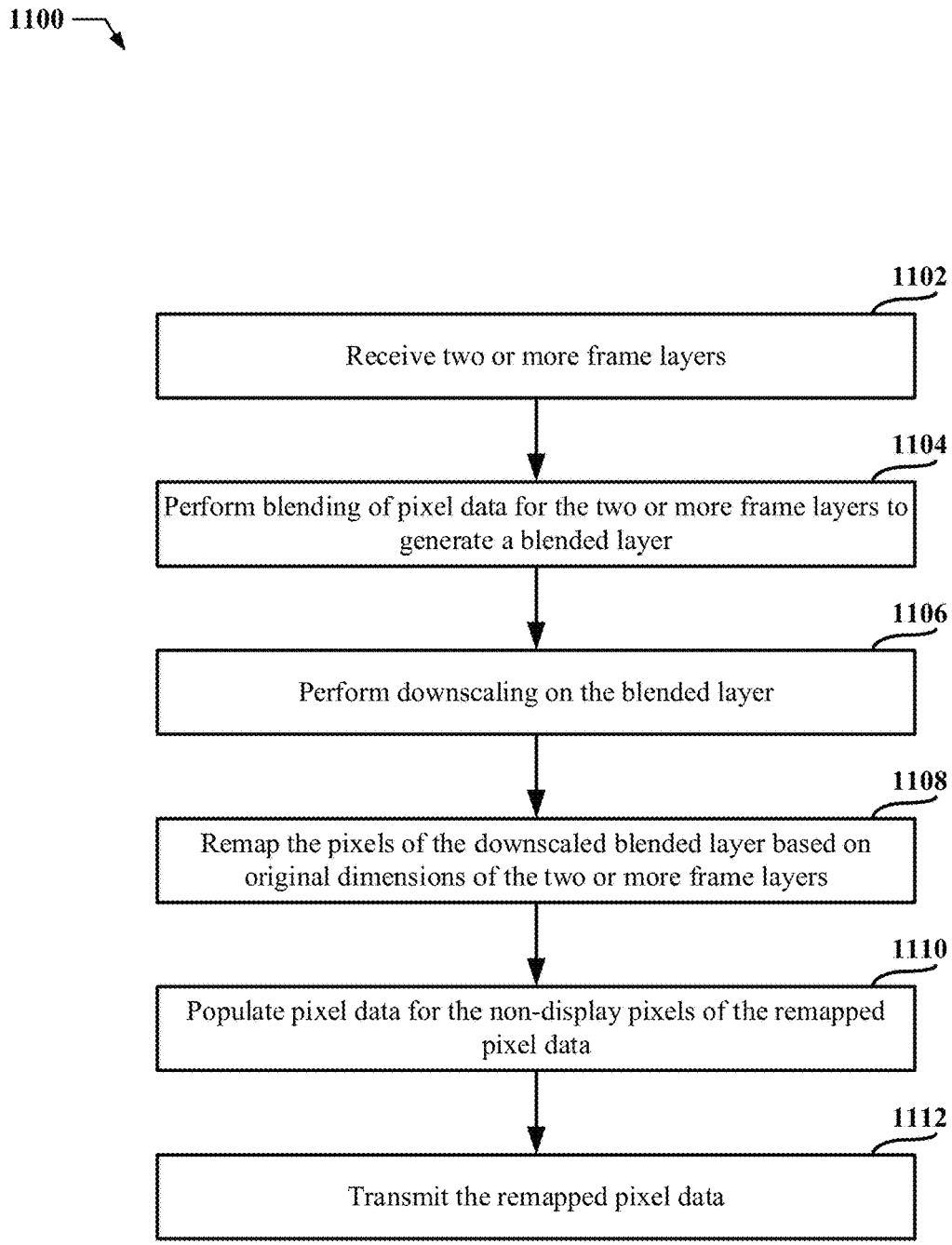

FIG. 11 illustrates an example flowchart 1100 of an example method in accordance with one or more techniques of this disclosure. The method may be performed by an apparatus, such as the device 104 of FIG. 1, the GPU 250, a DPU, and/or a video processor.

At 1102, the apparatus may receive two or more frame layers, as described in connection with the examples of FIGS. 1 to 7 and/or 8. For example, the GPU 250 may receive pixel data 520 for the frame layers 255, 510 that correspond to the region(s) of the display 136 associated with the relatively lower pixel densities. It should be appreciated that the pixel data for the two or more frame layers may be associated with dimensions, such as a 200×200 region (as shown in FIG. 3).

At 1104, the apparatus may perform blending of pixel data for the two or more frame layers to generate a blended layer, as described in connection with the examples of FIGS. 1 to 7 and/or 8. For example, the GPU 250 may perform blending of the pixel data to generate a blended layer, such as the example blended images 610, 710, 810 of FIGS. 6, 7, and 8, respectively.

At 1106, the apparatus may perform downscaling on the blended layer, as described in connection with the examples of FIGS. 1 to 7 and/or 8. For example, the GPU 250 may perform downscaling of the blended images 610, 710, 810 to generate the example downscaled images 620, 720, 820 of FIGS. 6, 7, and 8, respectively.

At 1108, the apparatus may remap the pixels of the downscaled blended layer based on original dimensions of the two or more frame layers, as described in connection with the examples of FIGS. 1 to 7 and/or 8. For example, the GPU 250 may remap the pixels of the downscaled images 620, 720, 820 to generate the remapped images 630, 730, 830 of FIGS. 6, 7, and 8, respectively.

At 1110, the apparatus may populate pixel data for the non-valid pixels of the remapped pixel data, as described in connection with the examples of FIGS. 1 to 7 and/or 8. For example, the GPU 250 may populate the locations of the remapped image 630 corresponding to the non-valid pixels 250 with duplicate pixel data (as shown in FIG. 7), with NULL pixel data, with black pixels, or with pixel data associated with another color (e.g., a combined color based on one or more neighboring pixels, etc.).

At 1112, the apparatus may transmit the remapped pixel data, as described in connection with the examples of FIGS. 1 to 7 and/or 8. For example, the GPU 250 may transmit the remapped images 630, 730, 830 to the display processor 127.

It should be appreciated that in some examples, the apparatus may transmit the blended layer to the display processor 127. For example, after performing the blending of the pixel data of the two or more frame layers (at 1104), the GPU 250 may transmit the blended layer to the display processor 127 for performing post-processing techniques. In some examples, the GPU 250 may receive instructions to perform one or more post-processing techniques.

Figure 12:
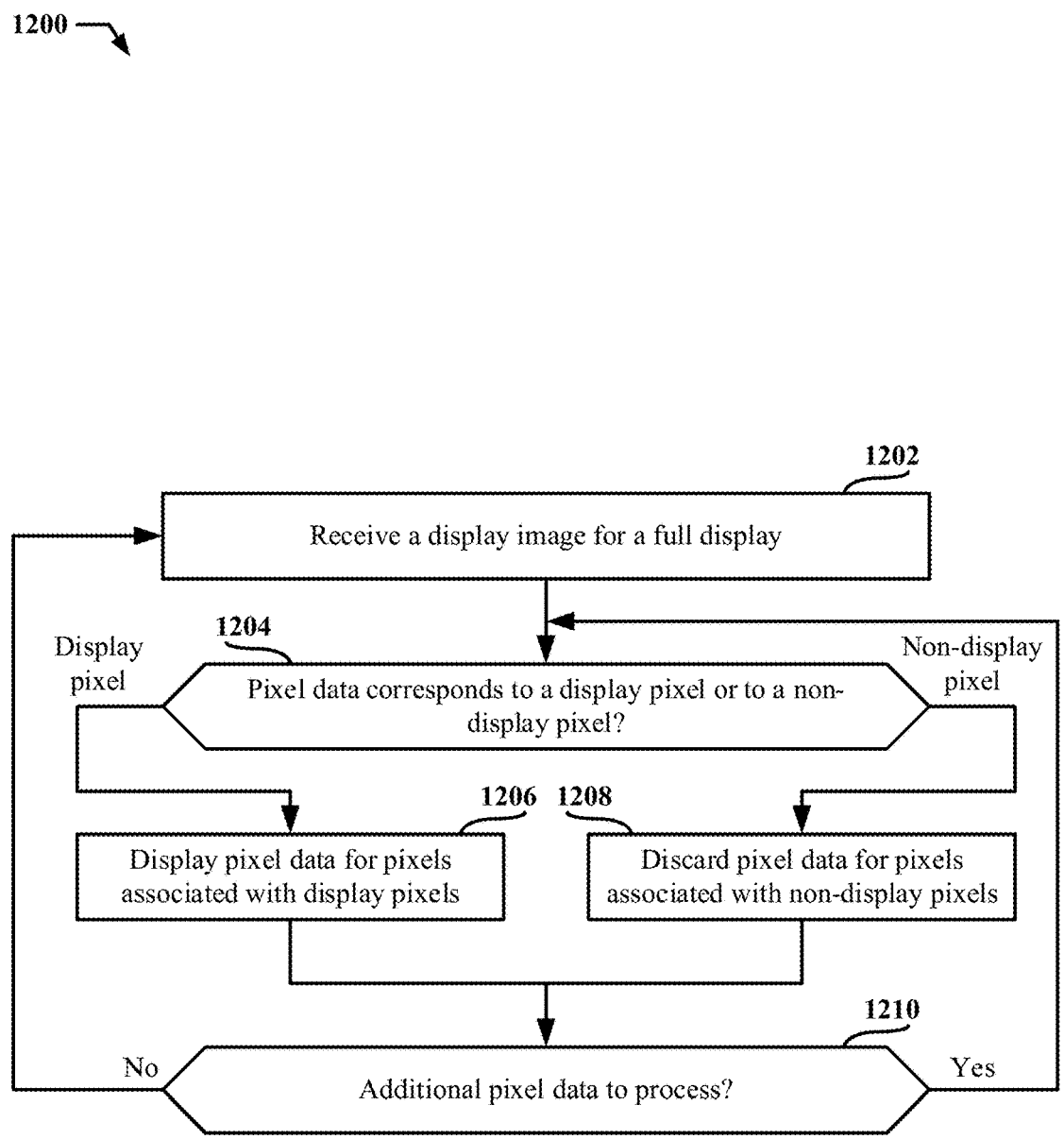

FIG. 12 illustrates an example flowchart 1200 of an example method in accordance with one or more techniques of this disclosure. The method may be performed by an apparatus, such as the device 104 of FIG. 1, the display client 131 of FIGS. 1 and/or 2, a DPU, a GPU, a video processor, and/or a component of the display client 131, such as the display 136 of FIGS. 1 and/or 2.

At 1202, the apparatus may receive a display image for a full display, as described in connection with the examples of FIGS. 1 to 7 and/or 8. For example, the display client 131 may receive the display image 280 including regions associated with a first pixel density (e.g., pixel data corresponding to the region 330 of FIG. 3) and region(s) of the display 136 associated with a second pixel density (e.g., pixel data corresponding to the relatively lower pixel densities of regions 310 of FIG. 3).

At 1204, the apparatus may determine whether pixel data for the display image corresponds to a display pixel or a non-display pixel, as described in connection with the examples of FIGS. 1 to 7 and/or 8. For example, the display client 131 may determine whether pixel data associated with a location of the display 136 corresponds to a valid pixel (e.g., the valid pixels 340) or to a non-valid pixel (e.g. the non-valid pixels 350). In some examples, the display client 131 may additionally or alternatively apply a screen mask (e.g., the example screen mask 840 of FIG. 8) to pixel data of the display image 280 to determine whether the respective pixel data corresponds to a display pixel or to a non-display pixel (e.g., as shown in FIG. 8).

If, at 1204, the apparatus determines that the pixel data corresponds to a display pixel, then, at 1206, the apparatus may display the pixel data for the pixels associated with display pixels, as described in connection with the examples of FIGS. 1 to 7 and/or 8. For example, the display client 131 may cause the display 136 to present the pixel data of the display image 280 corresponding to locations of the valid pixels 340 of the display 136. It should be appreciated that the valid pixels 340 may be included in region(s) of the display 136 associated with a first pixel density (e.g., the region 330 of FIG. 3) and/or region(s) of the display 136 associated with a second pixel density (e.g., the relatively lower pixel densities of regions 310, 320 of FIG. 3). Control may then proceed to 1210 to determine if there is additional pixel data to process.

If, at 1204, the apparatus determines that the pixel data corresponds to a non-display pixel, then, at 1208, the apparatus may discard the pixel data for the pixels associated with non-display pixels, as described in connection with the examples of FIGS. 1 to 7 and/or 8. For example, the display client 131 may discard the pixel data of the display image 280 corresponding to locations of the non-valid pixels 350 of the display 136, 300 and/or locations based on a screen mask. Control may then proceed to 1210 to determine if there is additional pixel data to process.

At 1210, the apparatus may determine whether there is additional pixel data to process, as described in connection with the examples of FIGS. 1 to 7 and/or 8. For example, in some examples, the display client 131 may process the display image 280 for presentment in a line-by-line manner. In some such examples, the display client 131 may determine whether the display image 280 includes any unprocessed pixel data (e.g., pixel data for a line of the display image 280 that has not been processed for presentment).

If, at 1210, the apparatus determines that there is additional pixel data to process (e.g., pixel data for a line of the display image 280 that is unprocessed), then control may return to 1204 to determine whether pixel data corresponds to a display pixel or a non-display pixel.

If, at 1210, the apparatus determines that there is no additional pixel data to process (e.g., the apparatus has processed the pixel data of the display image 280), then control may return to 1202 to wait to receive another display image for presentment.

In one configuration, a method or apparatus for display processing is provided. The apparatus may be a processing unit, a display processor, a display processing unit (DPU), a GPU), a video processor, or some other processor that can perform display processing. In some examples, the apparatus may be the processing unit 120 within the device 104, or may be some other hardware within the device 104, or another device. The apparatus may include means for identifying a subsection of a set of frame layers, the identified subsection corresponding to a lower pixel density region, relative to at least one other region, of a display. The apparatus may also include means for blending first pixel data for each frame layer corresponding to the identified subsection to generate second pixel data. The apparatus may also include means for populating a buffer layer based on the second pixel data. Further, the apparatus may include means for blending pixel data from the set of frame layers and the buffer layer to generate a blended image. Additionally, the apparatus may include means for transmitting the blended image for presentment via a display. The apparatus may include means for masking the first pixel data for each frame layer corresponding to the identified subsection with the second pixel data of the buffer layer. The apparatus may include means for setting the buffer layer as a highest layer of the frame layers. The apparatus may also include means for setting a transparency of the buffer layer to zero. The apparatus may also include means for blending the first pixel data for each frame layer corresponding to the identified subsection to generate a blended subsection. Also, the apparatus may include means for downscaling the blended subsection to generate a downscaled subsection. Further, the apparatus may include means for remapping pixel data from the downscaled subsection to the identified subsection to generate the second pixel data. Additionally, the apparatus may include means for transmitting the first pixel data for each frame layer corresponding to the identified subsection to a GPU, where the blending of the first pixel data, the downscaling of the blended subsection, and the remapping of the pixel data are performed by the GPU, and the method further comprises receiving the second pixel data from the GPU. The apparatus may also include means for receiving the set of frame layers from at least one application.

Each of the above-referenced means, including the means for identifying a subsection of a set of frame layers, the identified subsection corresponding to a lower pixel density region, relative to at least one other region, of a display, means for blending first pixel data for each frame layer corresponding to the identified subsection to generate second pixel data, means for populating a buffer layer based on the second pixel data, means for blending pixel data from the set of frame layers and the buffer layer to generate a blended image, and means for transmitting the blended image for presentment via a display may be performed by the above-referenced apparatuses and/or devices (e.g., device 104 of FIG. 1, the display client 131 of FIGS. 1 and/or 2, a DPU, a GPU, a video processor, and/or a component of the display client 131, such as the display 136, display processor 127, CPU 205, GPU 250, and/or corresponding structures within these components (e.g., regional processing component 198), of FIGS. 1 and/or 2).

The subject matter described herein can be implemented to realize one or more benefits or advantages. For instance, the described display and/or graphics processing techniques can be used by a display processor, a display processing unit (DPU), a GPU, or a video processor or some other processor that can perform display processing to implement the improving of visual quality of a display image presented via a display including regions with different pixel densities and/or reduce the load of a processing unit (e.g., any processing unit configured to perform one or more techniques disclosed herein, such as a GPU, a DPU, and the like). In general, examples disclosed herein provide techniques for regional processing of images for displays including under-display devices.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

The following examples are illustrative only and may be combined with aspects of other embodiments or teachings described herein, without limitation.

Example 1 is a method of display processing, comprising: identifying a subsection of a set of frame layers, the identified subsection corresponding to a lower pixel density region, relative to at least one other region, of a display; blending first pixel data for each frame layer corresponding to the identified subsection to generate second pixel data; populating a buffer layer based on the second pixel data; blending pixel data from the set of frame layers and the buffer layer to generate a blended image; and transmitting the blended image for presentment via the display.

Example 2 is an apparatus for display processing, comprising: a memory; and at least one processor coupled to the memory and configured to: identify a subsection of a set of frame layers, the identified subsection corresponding to a lower pixel density region, relative to a density of at least one other region, of a display; blend first pixel data for each frame layer corresponding to the identified subsection to generate second pixel data; populate a buffer layer based on the second pixel data; blend pixel data from the set of frame layers and the buffer layer to generate a blended image; and transmit the blended image for presentment via the display.

Example 3 is an apparatus for display processing, comprising: means for identifying a subsection of a set of frame layers, the identified subsection corresponding to a lower pixel density region, relative to at least one other region, of a display; means for blending first pixel data for each frame layer corresponding to the identified subsection to generate second pixel data; means for populating a buffer layer based on the second pixel data; means for blending pixel data from the set of frame layers and the buffer layer to generate a blended image; and means for transmitting the blended image for presentment via the display.

Example 4 is a computer-readable medium storing computer executable code for display processing, comprising code to: identify a subsection of a set of frame layers, the identified subsection corresponding to a lower pixel density region, relative to at least one other region, of a display; blend first pixel data for each frame layer corresponding to the identified subsection to generate second pixel data; populate a buffer layer based on the second pixel data; blend pixel data from the set of frame layers and the buffer layer to generate a blended image; and transmit the blended image for presentment via the display.

Example 5 is the method, apparatus, and computer-readable medium of any of Examples 1~4 wherein the masking of the first pixel data comprises: masking the first pixel data for each frame layer corresponding to the identified subsection with the second pixel data of the buffer layer.

Example 6 is the method, apparatus, and computer-readable of Example 5 wherein the masking of the first pixel data comprises: setting the buffer layer as a highest layer of the frame layers; and setting a transparency of the buffer layer to zero.

Example 7 is the method, apparatus, and computer-readable medium of any of Examples 1~4 wherein the generating of the second pixel data further comprises: downscaling the blended first pixel data to generate a downscaled subsection; and remapping pixel data from the downscaled subsection to the identified subsection to generate the second pixel data.

Example 8 is the method, apparatus, and computer-readable medium of Example 7 wherein the generating of the second pixel data further comprises transmitting the first pixel data for each frame layer corresponding to the identified subsection to a graphics processing unit (GPU), wherein the blending of the first pixel data, the downscaling of the blended first pixel data, and the remapping of the pixel data are performed by the GPU, and the method further comprises receiving the second pixel data from the GPU.

Example 9 is the method, apparatus, and computer-readable medium of Example 7 wherein the second pixel data includes duplicate pixel data from locations corresponding to non-valid pixel locations of the display.

Example 10 is the method, apparatus, and computer-readable medium of Example 7 wherein the identifying of the subsection, the populating of the buffer layer, the blending of the pixel data, and the transmitting of the blended image are performed by a display processor.

Example 11 is the method, apparatus, and computer-readable medium of any of Examples 1-4 wherein the set of frame layers are received from at least one application.

Example 12 is the method, apparatus, and computer-readable medium of any of Examples 1-4 wherein the identified subsection is above at least one of an under-display camera, an under-display fingerprint reader, or other under-display device.

What is claimed is:

1. A method of display processing, comprising:
    identifying a subsection of a set of frame layers, the identified subsection corresponding to a lower pixel density region, relative to at least one other region, of a display, wherein the lower pixel density region of the display comprises a lower quantity of pixels capable of presenting pixel data on the display relative to the at least one other region;
    blending first pixel data for each frame layer corresponding to the identified subsection to generate second pixel data;
    populating a buffer layer based on the second pixel data;
    blending pixel data from the set of frame layers and the buffer layer to generate a blended image; and
    transmitting the blended image for presentment via the display.

2. The method of claim 1, wherein the blending of the pixel data comprises:
    masking the first pixel data for each frame layer corresponding to the identified subsection with the second pixel data of the buffer layer.

3. The method of claim 2, wherein the masking of the first pixel data comprises:
    setting the buffer layer as a highest layer of the frame layers; and
    setting a transparency of the buffer layer to zero.

4. The method of claim 1, wherein the generating of the second pixel data further comprises:
    downscaling the blended first pixel data to generate a downscaled subsection; and
    remapping pixel data from the downscaled subsection to the identified subsection to generate the second pixel data.

5. The method of claim 4, wherein the generating of the second pixel data further comprises transmitting the first pixel data for each frame layer corresponding to the identified subsection to a graphics processing unit (GPU), wherein the blending of the first pixel data, the downscaling of the blended first pixel data, and the remapping of the pixel data are performed by the GPU, and the method further comprises receiving the second pixel data from the GPU.

6. The method of claim 4, wherein the second pixel data includes duplicate pixel data from locations corresponding to non-valid pixel locations of the display.

7. The method of claim 1, wherein the identifying of the subsection, the populating of the buffer layer, the blending of the pixel data, and the transmitting of the blended image are performed by a display processor.

8. The method of claim 1, wherein the set of frame layers are received from at least one application.

9. The method of claim 1, wherein the identified subsection is above at least one of an under-display camera, an under-display fingerprint reader, or other under-display device.

10. An apparatus for display processing, comprising:
    a memory; and
    at least one processor coupled to the memory and configured to:
        identify a subsection of a set of frame layers, the identified subsection corresponding to a lower pixel density region, relative to a density of at least one other region, of a display, wherein the lower pixel density region of the display comprises a lower quantity of pixels capable of presenting pixel data on the display relative to the at least one other region;
        blending first pixel data for each frame layer corresponding to the identified subsection to generate second pixel data;
        populate a buffer layer based on the second pixel data;
        blend pixel data from the set of frame layers and the buffer layer to generate a blended image; and
        transmit the blended image for presentment via the display.

11. The apparatus of claim 10, wherein the at least one processor is configured to blend the pixel data by:
    masking the first pixel data for each frame layer corresponding to the identified subsection with the second pixel data of the buffer layer.

12. The apparatus of claim 11, wherein the at least one processor is configured to mask the first pixel data by:
    setting the buffer layer as a highest layer of the frame layers; and
    setting a transparency of the buffer layer to zero.

13. The apparatus of claim 10, wherein the at least one processor is further configured to generate the second pixel data by:
    downscaling the blended first pixel data to generate a downscaled subsection; and
    remapping pixel data from the downscaled subsection to the identified subsection to generate the second pixel data.

14. The apparatus of claim 13, wherein the at least one processor is configured to generate the second pixel data by:
    transmitting the first pixel data for each frame layer corresponding to the identified subsection to a graphics processing unit (GPU), and wherein the blending of the first pixel data, the downscaling of the blended first pixel data, and the remapping of the pixel data are performed by the GPU; and receiving the second pixel data from the GPU.

15. The apparatus of claim 13, wherein the second pixel data includes duplicate pixel data from locations corresponding to non-valid pixel locations of the display.

16. The apparatus of claim 10, wherein the at least one processor includes a display processor configured to perform the identifying of the subsection, the populating of the buffer layer, the blending of the pixel data, and the transmitting of the blended image.

17. The apparatus of claim 10, wherein the at least one processor is further configured to receive the set of frame layers from at least one application.

18. The apparatus of claim 10, wherein the at least one processor is further configured to identify the subsection above at least one of an under-display camera, an under-display fingerprint reader, or other under-display device.

19. The apparatus of claim 10, wherein the apparatus comprises a wireless communication device.

20. A non-transitory computer-readable medium storing computer executable code for display processing, the code when executed by one or more processors causes the one or more processors to:

identify a subsection of a set of frame layers, the identified subsection corresponding to a lower pixel density region, relative to at least one other region, of a display, wherein the lower pixel density region of the display comprises a lower quantity of pixels capable of presenting pixel data on the display relative to the at least one other region;

blend first pixel data for each frame layer corresponding to the identified subsection to generate second pixel data;

populate a buffer layer based on the second pixel data;

blend pixel data from the set of frame layers and the buffer layer to generate a blended image; and transmit the blended image for presentment via the display.

* * * * *